United States Patent
Wang et al.

(10) Patent No.: US 11,122,569 B2
(45) Date of Patent: Sep. 14, 2021

(54) METHOD AND APPARATUS FOR TRANSMITTING BASE STATION DATA, AND DEVICE

(71) Applicant: HUAWEI TECHNOLOGIES CO., LTD., Guangdong (CN)

(72) Inventors: Libiao Wang, Shenzhen (CN); Fan Jin, Shenzhen (CN); Wei Chen, Shanghai (CN); Xiaolong Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/720,549

(22) Filed: Dec. 19, 2019

(65) Prior Publication Data

US 2020/0128548 A1  Apr. 23, 2020

Related U.S. Application Data

(63) Continuation of application No. PCT/CN2017/090875, filed on Jun. 29, 2017.

(51) Int. Cl.
*H04W 72/04* (2009.01)
*H04B 7/06* (2006.01)
(Continued)

(52) U.S. Cl.
CPC ...... *H04W 72/0453* (2013.01); *H04B 7/0632* (2013.01); *H04B 7/0634* (2013.01);
(Continued)

(58) Field of Classification Search
CPC . H04W 72/0453; H04W 16/28; H04W 64/00; H04W 72/0493; H04B 7/0632;
(Continued)

(56) References Cited

U.S. PATENT DOCUMENTS

2016/0037499 A1  2/2016  He
2016/0080064 A1  3/2016  Kim et al.
(Continued)

FOREIGN PATENT DOCUMENTS

CN  101667896 A  3/2010
CN  102625356 A  8/2012
(Continued)

OTHER PUBLICATIONS

Office Action issued in Chinese Application No. 201780092504.2 dated Oct. 10, 2020, 11 pages.
(Continued)

*Primary Examiner* — Thai Nguyen
(74) *Attorney, Agent, or Firm* — Fish & Richardson P.C.

(57) ABSTRACT

This application provides an example method for transmitting base station data. The method includes receiving a precoding matrix indication (PMI) value and reference signal received power (RSRP) that are sent by user equipment. The method also includes determining, based on the PMI value, a network area group corresponding to the user equipment. The method further includes determining, based on the RSRP, a network area in which the user equipment is located.

15 Claims, 6 Drawing Sheets

(51) Int. Cl.
*H04W 16/28* (2009.01)
*H04W 64/00* (2009.01)

(52) U.S. Cl.
CPC ........... *H04W 16/28* (2013.01); *H04W 64/00* (2013.01); *H04W 72/0493* (2013.01)

(58) Field of Classification Search
CPC .... H04B 7/0634; H04B 7/024; H04B 7/0695; H04B 7/088; H04B 7/0639
See application file for complete search history.

(56) References Cited

U.S. PATENT DOCUMENTS

| | | | |
|---|---|---|---|
| 2016/0353294 | A1 | 12/2016 | Wang et al. |
| 2017/0099093 | A1 | 4/2017 | Zhang et al. |
| 2017/0149480 | A1* | 5/2017 | Kakishima ............. H04B 7/024 |
| 2018/0198499 | A1* | 7/2018 | Park ........................ H04B 7/06 |
| 2019/0157770 | A1* | 5/2019 | Park .................... H04B 7/0482 |

FOREIGN PATENT DOCUMENTS

| | | |
|---|---|---|
| CN | 102823152 A | 12/2012 |
| CN | 103313299 A | 9/2013 |
| CN | 106413005 A | 2/2017 |
| CN | 106888039 A | 6/2017 |
| EP | 2566266 A1 | 3/2013 |
| EP | 3376698 A1 | 9/2018 |
| KR | 20150103363 A | 9/2015 |
| WO | 2015149312 A1 | 10/2015 |
| WO | 2015180178 A1 | 12/2015 |
| WO | 2017049599 A1 | 3/2017 |
| WO | 2017092383 A1 | 6/2017 |

OTHER PUBLICATIONS

Extended European Search Report issued in European Application No. 17915941.3 dated Mar. 9, 2020, 11 pages.

PCT International Search Report and Written Opinion in International Application No. PCT/CN2017/090,875, dated Feb. 28, 2018, 17 pages (With English Translation).

Office Action issued in Korean Application No. 2020-7002379 dated Jun. 22, 2021, 7 pages (with English translation).

\* cited by examiner

| Precoding matrix indication value | Network area group |
|---|---|
| 0, 2, 9, 11 | Odd-numbered network area group |
| 1, 3, 8, 10 | Even-numbered network area group |
| 4, 5, 6, 7, 12, 13, 14, 15 | Overlapped network area group |

METHOD AND APPARATUS FOR TRANSMITTING BASE STATION DATA, AND DEVICE

CROSS-REFERENCE TO RELATED APPLICATIONS

This application is a continuation of International Application No. PCT/CN2017/090875, filed on Jun. 29, 2017, the disclosure of which is hereby incorporated by reference in its entirety.

TECHNICAL FIELD

The present invention relates to the field of communication, and in particular, to a method and an apparatus for transmitting base station data, and a device.

BACKGROUND

With development of wireless communications systems, a system capacity is greatly improved by using technologies such as a multiple input multiple output (MIMO) technology and a higher order modulation technology. To obtain more spatial multiplexing gains, a cell capacity is greatly improved by using a multi-sector multi-beam technology. However, as the quantity of sectors or beams of a single site increases, because a same frequency band is shared among the sectors or the beams, user equipment (UE) served by the single site may be strongly interfered with within coverage of the sectors or the beams, and performance of the UE located within the coverage of the sectors or the beams may be affected greatly.

SUMMARY

In view of the foregoing technical problem, embodiments of the present invention provide a method for transmitting base station data, to resolve a problem of interference between network areas in the prior art.

According to a first aspect, a method for transmitting base station data is provided, and includes the following steps: receiving a precoding matrix indication PMI value and reference signal received power RSRP that are sent by user equipment; determining, based on the RSRP, a network area in which the user equipment is located; if the user equipment is in an odd-numbered network area group, allocating an equivalent channel in a first channel group to the user equipment based on the PMI value; if the user equipment is in an even-numbered network area group, allocating an equivalent channel in a second channel group to the user equipment based on the PMI value; and if the user equipment is in an overlapped network area group, obtaining a first network area corresponding to a largest value in the RSRP and a second network area corresponding to a second largest value in the RSRP, allocating an equivalent channel in a third channel group to the user equipment based on the PMI value, and stopping allocating equivalent channels to the first network area and the second network area, where a radio frequency channel occupied by the first channel group is different from a radio frequency channel occupied by the second channel group.

According to the method provided in the first aspect, network areas are classified into three area groups, and radio frequency channels are allocated to the three area groups. In this way, devices in the three area groups do not interfere with each other through allocation of the radio frequency channels, thereby reducing interference between network areas.

In an optional solution, the network area is a sector or a beam.

In another optional solution, if the user equipment is in the odd-numbered network area group, when PMI=0, a first equivalent channel in the first channel group and allocated to the user equipment is:

$$[T_0 \ \ldots \ T_{2M-1}]V\frac{1}{2}\begin{bmatrix}1\\1\\1\\1\end{bmatrix} = [T_0 \ \ldots \ T_{2M-1}]\frac{1}{\sqrt{2}}\begin{bmatrix}1\\1\\0\\0\\1\\1\\0\\0\\\vdots\end{bmatrix},$$

where $T_{2M-1}$ is a $(2M)^{th}$ network area, V is a port mapping matrix of the user equipment, and the ellipsis represents 2M−8 repeated digits;

when PMI=2, a second equivalent channel in the first channel group and allocated to the user equipment is:

$$[T_0 \ \ldots \ T_{2M-1}]V\frac{1}{2}\begin{bmatrix}1\\-1\\1\\-1\end{bmatrix} = [T_0 \ \ldots \ T_{2M-1}]\frac{1}{\sqrt{2}}\begin{bmatrix}1\\-1\\0\\0\\1\\-1\\0\\0\\\vdots\end{bmatrix};$$

when PMI=9, a third equivalent channel in the first channel group and allocated to the user equipment is:

$$[T_0 \ \ldots \ T_{2M-1}]V\frac{1}{2}\begin{bmatrix}1\\j\\1\\j\end{bmatrix} = [T_0 \ \ldots \ T_{2M-1}]\frac{1}{\sqrt{2}}\begin{bmatrix}1\\j\\0\\0\\1\\j\\0\\0\\\vdots\end{bmatrix};$$

and when PMI=11, a fourth equivalent channel in the first channel group and allocated to the user equipment is:

$$[T_0 \ \ldots \ T_{2M-1}]V\frac{1}{2}\begin{bmatrix}1\\-j\\1\\-j\end{bmatrix} = [T_0 \ \ldots \ T_{2M-1}]\frac{1}{\sqrt{2}}\begin{bmatrix}1\\-j\\0\\0\\1\\-j\\0\\0\\\vdots\end{bmatrix}.$$

In still another optional solution, if the user equipment is in the even-numbered network area group, when PMI=1, a fifth equivalent channel in the second channel group and allocated to the user equipment is:

$$[T_0 \ \ldots \ T_{2M-1}]V\frac{1}{2}\begin{bmatrix}1\\j\\-1\\-j\end{bmatrix} = [T_0 \ \ldots \ T_{2M-1}]\frac{1}{\sqrt{2}}\begin{bmatrix}0\\0\\j\\-1\\0\\0\\j\\-1\\\vdots\end{bmatrix},$$

where $T_{2M-1}$ is a $(2M)^{th}$ network area, V is a port mapping matrix of the user equipment, and the ellipsis represents 2M−8 repeated digits;

when PMI=3, a sixth equivalent channel in the second channel group and allocated to the user equipment is:

$$[T_0 \ \ldots \ T_{2M-1}]V\frac{1}{2}\begin{bmatrix}1\\-j\\-1\\j\end{bmatrix} = [T_0 \ \ldots \ T_{2M-1}]\frac{1}{\sqrt{2}}\begin{bmatrix}0\\0\\j\\1\\0\\0\\j\\1\\\vdots\end{bmatrix};$$

when PMI=8, a seventh equivalent channel in the second channel group and allocated to the user equipment is:

$$[T_0 \ \ldots \ T_{2M-1}]V\frac{1}{2}\begin{bmatrix}1\\1\\-1\\-1\end{bmatrix} = [T_0 \ \ldots \ T_{2M-1}]\frac{1}{\sqrt{2}}\begin{bmatrix}0\\0\\1\\1\\0\\0\\1\\1\\\vdots\end{bmatrix};$$

and when PMI=10, an eighth equivalent channel in the second channel group and allocated to the user equipment is:

$$[T_0 \ \ldots \ T_{2M-1}]V\frac{1}{2}\begin{bmatrix}1\\-1\\-1\\1\end{bmatrix} = [T_0 \ \ldots \ T_{2M-1}]\frac{1}{\sqrt{2}}\begin{bmatrix}0\\0\\1\\-1\\0\\0\\1\\-1\\\vdots\end{bmatrix}.$$

In yet another optional solution, if the user equipment is in the overlapped network area group, when PMI=4, a ninth equivalent channel in the third channel group and allocated to the user equipment is:

$$[T_0 \ \ldots \ T_{2M-1}]V\frac{1}{2}\begin{bmatrix}1\\\frac{1}{\sqrt{2}}(1+j)\\j\\-\frac{1}{\sqrt{2}}(1-j)\end{bmatrix} = [T_0 \ \ldots \ T_{2M-1}]\frac{1}{\sqrt{2}}\begin{bmatrix}\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\vdots\end{bmatrix},$$

where $T_{2M-1}$ is a $(2M)^{th}$ network area, V is a port mapping matrix of the user equipment, and the ellipsis represents 2M−8 repeated digits;

when PMI=5, a tenth equivalent channel in the third channel group and allocated to the user equipment is:

$$[T_0 \ \ldots \ T_{2M-1}]V\frac{1}{2}\begin{bmatrix}1\\-\frac{1}{\sqrt{2}}(1-j)\\-j\\\frac{1}{\sqrt{2}}(1+j)\end{bmatrix} = [T_0 \ \ldots \ T_{2M-1}]\frac{1}{\sqrt{2}}\begin{bmatrix}\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\vdots\end{bmatrix};$$

when PMI=6, an eleventh equivalent channel in the third channel group and allocated to the user equipment is:

$$[T_0 \ \ldots \ T_{2M-1}]V\frac{1}{2}\begin{bmatrix}1\\-\frac{1}{\sqrt{2}}(1+j)\\j\\\frac{1}{\sqrt{2}}(1-j)\end{bmatrix} = [T_0 \ \ldots \ T_{2M-1}]\frac{1}{\sqrt{2}}\begin{bmatrix}\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\vdots\end{bmatrix};$$

when PMI=7, a twelfth equivalent channel in the third channel group and allocated to the user equipment is:

$$[T_0 \ \ldots \ T_{2M-1}]V\frac{1}{2}\begin{bmatrix}1\\\frac{1}{\sqrt{2}}(1-j)\\-j\\-\frac{1}{\sqrt{2}}(1+j)\end{bmatrix} = [T_0 \ \ldots \ T_{2M-1}]\frac{1}{\sqrt{2}}\begin{bmatrix}\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\vdots\end{bmatrix};$$

when PMI=12, a thirteenth equivalent channel in the third channel group and allocated to the user equipment is:

$$[T_0 \ \ldots \ T_{2M-1}]V\frac{1}{2}\begin{bmatrix}1\\1\\1\\-1\end{bmatrix} = [T_0 \ \ldots \ T_{2M-1}]\frac{1}{\sqrt{2}}\begin{bmatrix}1\\0\\0\\j\\1\\0\\0\\j\\\vdots\end{bmatrix};$$

when PMI=13, a fourteenth equivalent channel in the third channel group and allocated to the user equipment is:

$$[T_0 \ \ldots \ T_{2M-1}]V\frac{1}{2}\begin{bmatrix}1\\1\\-1\\1\end{bmatrix} = [T_0 \ \ldots \ T_{2M-1}]\frac{1}{\sqrt{2}}\begin{bmatrix}0\\1\\j\\0\\0\\1\\j\\0\\\vdots\end{bmatrix};$$

when PMI=14, a fifteenth equivalent channel in the third channel group and allocated to the user equipment is:

$$[T_0 \ \ldots \ T_{2M-1}]V\frac{1}{2}\begin{bmatrix}-1\\1\\1\\1\end{bmatrix} = [T_0 \ \ldots \ T_{2M-1}]\frac{1}{\sqrt{2}}\begin{bmatrix}0\\1\\-j\\0\\0\\1\\-j\\0\\\vdots\end{bmatrix};$$

and
when PMI=15, a sixteenth equivalent channel in the third channel group and allocated to the user equipment is:

$$[T_0 \ \ldots \ T_{2M-1}]V\frac{1}{2}\begin{bmatrix}1\\-1\\-1\\-1\end{bmatrix} = [T_0 \ \ldots \ T_{2M-1}]\frac{1}{\sqrt{2}}\begin{bmatrix}0\\-1\\j\\0\\0\\-1\\j\\0\\\vdots\end{bmatrix}.$$

According to a second aspect, an apparatus for transmitting base station data is provided, and includes: a receiving unit, configured to receive a precoding matrix indication PMI value and reference signal received power RSRP that are sent by user equipment; and a processing unit, configured to: determine, based on the RSRP, a network area in which the user equipment is located; if the user equipment is in an odd-numbered network area group, allocate an equivalent channel in a first channel group to the user equipment based on the PMI value; if the user equipment is in an even-numbered network area group, allocate, an equivalent channel in a second channel group to the user equipment based on the PMI value; and if the user equipment is in an overlapped network area group, obtain a first network area corresponding to a largest value in the RSRP and a second network area corresponding to a second largest value in the RSRP, allocate an equivalent channel in a third channel group to the user equipment based on the PMI value, and stop allocating equivalent channels to the first network area and the second network area, where a radio frequency channel occupied by the first channel group is different from a radio frequency channel occupied by the second channel group.

According to the apparatus provided in the second aspect, network areas are classified into three area groups, and radio frequency channels are allocated to the three area groups. In this way, devices in the three area groups do not interfere with each other through allocation of the radio frequency channels, thereby reducing interference between network areas.

According to a third aspect, a base station device is provided, and includes a transceiver, a memory, and a processor. The processor is connected to the transceiver and the memory. The transceiver is configured to receive a precoding matrix indication PMI value and reference signal received power RSRP that are sent by user equipment. The processor is configured to: determine, based on the RSRP, a network area in which the user equipment is located; if the user equipment is in an odd-numbered network area group, allocate, an equivalent channel in a first channel group to the user equipment based on the PMI value; if the user equipment is in an even-numbered network area group, allocate an equivalent channel in a second channel group to the user equipment based on the PMI value; and if the user equipment is in an overlapped network area group, obtain a first network area corresponding to a largest value in the RSRP and a second network area corresponding to a second largest value in the RSRP, allocate an equivalent channel in a third channel group to the user equipment based on the PMI value, and stop allocating equivalent channels to the first network area and the second network area, where a radio frequency channel occupied by the first channel group is different from a radio frequency channel occupied by the second channel group.

According to a fourth aspect, a computer-readable storage medium is provided. The computer-readable storage medium stores a computer program used to exchange electronic data, where the computer program enables a computer to perform the method according to the first aspect.

According to a fifth aspect, a computer program product is provided, and includes a non-transitory computer-readable storage medium that stores a computer program, where the computer program is run to enable a computer to perform the method according to the first aspect.

BRIEF DESCRIPTION OF DRAWINGS

To describe technical solutions in embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
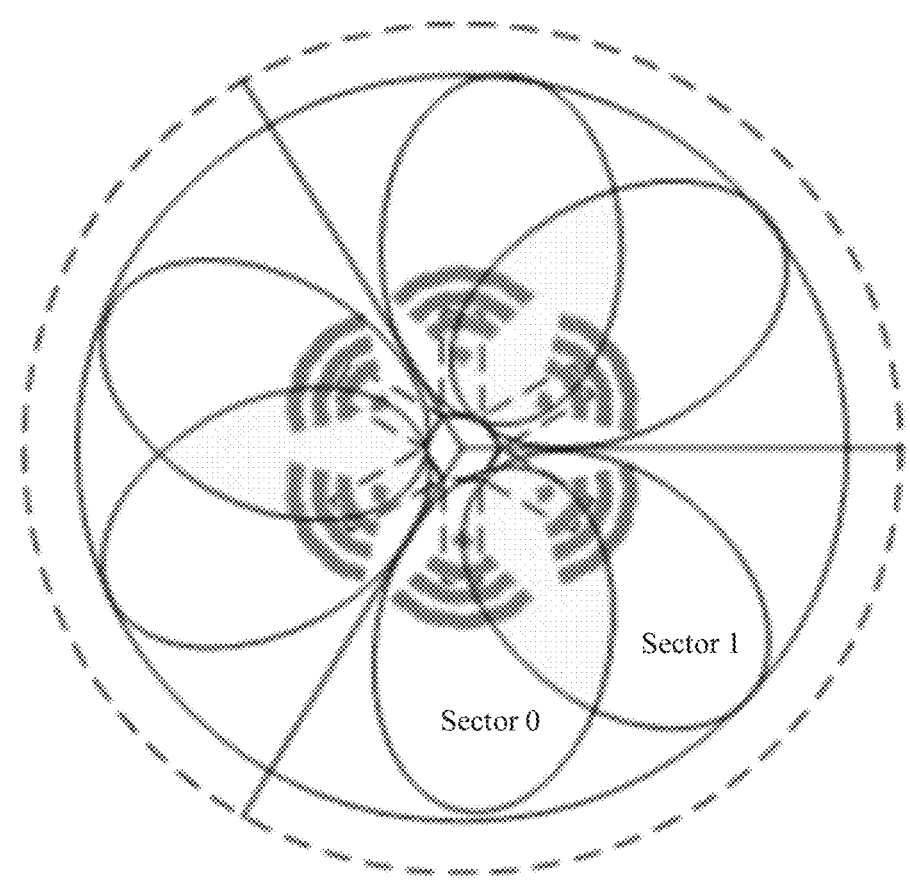
FIG. 1 is a schematic diagram of a network structure implementing V4T4R.

FIG. 1 is a schematic diagram of a virtual cell with virtual four transmitter four receiver (V4T4R). As shown in FIG. 1, the virtual cell is provided with six sectors or beams, and for ease of description, two of the six sectors or beams are named as Beam0 and Beam1. Based on a V4T4R technical solution, in an overlapped area of Beam0 and Beam1, data transmission is performed through independent scheduling, and a 4T4R mode is used to ensure transmission of four maximum streams. The following takes three UEs as a practical example, for ease of description, the three UEs are respectively named as UE 1, UE 2, and UE 3. The UE 1 is in a sector adjacent to Beam0, the UE 2 is in the overlapped area of Beam0 and Beam1, and the UE 3 is in a sector adjacent to Beam1. A base station uses the 4T4R mode to transmit data to the UE 2 in a slot 1, and transmits data to the UE 1 and the UE 3 in the slot 1. Because the base station transmits data in the 4T4R mode in the overlapped area, interference between UE in Beam0 and UE in Beam1 can be avoided. However, for the UE 1 or the UE 3, because the base station also transmits data in the slot 1, if the UE 1 is in an overlapped area of Beam0 and an adjacent sector, or the UE 3 is in an overlapped area of Beam1 and an adjacent sector, data transmission performed with the UE 1 or the UE 3 will affect data transmission performed with the UE 2, thereby causing interference.

Figures 2, 2A:
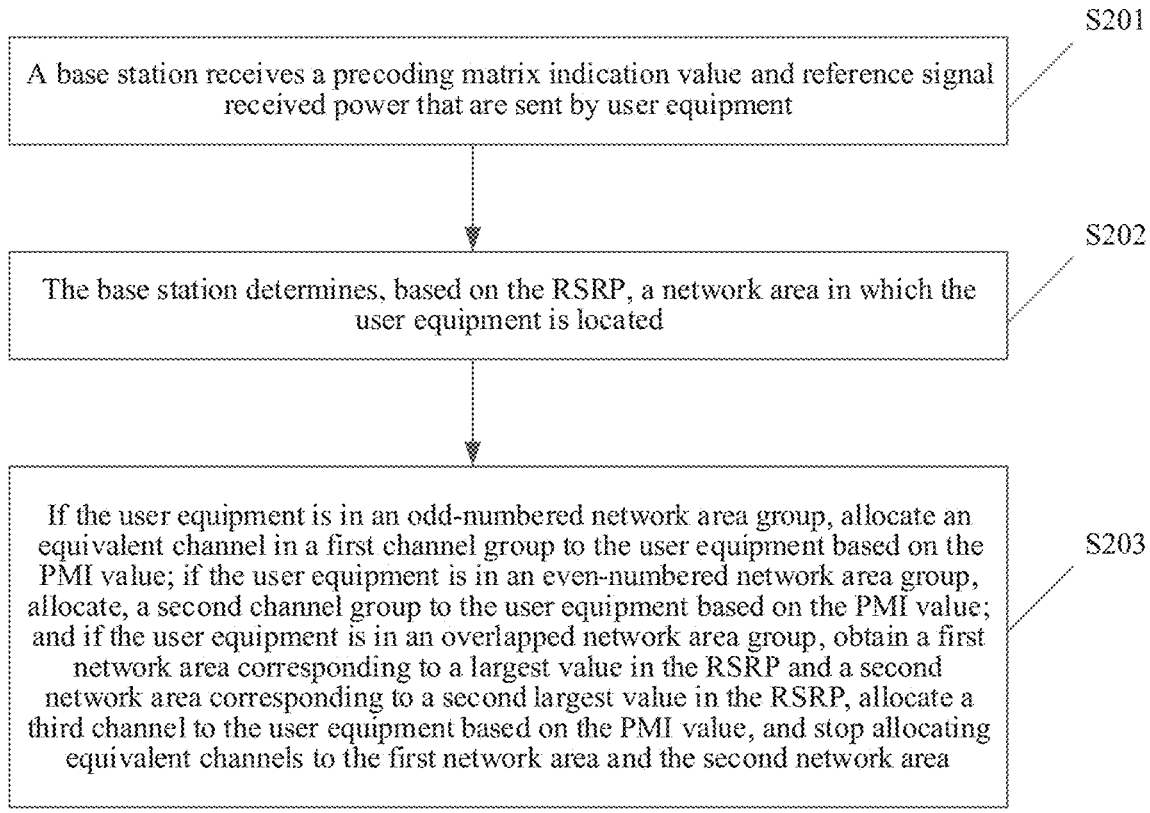
FIG. 2 is a schematic flowchart of a method for transmitting base station data according to an embodiment of this application.
FIG. 2A is a schematic diagram of a mapping relationship between a PMI value and a network area group.

FIG. 2 shows a method for transmitting base station data according to an embodiment of this application. The method is performed by a base station. As shown in FIG. 2, the method includes the following steps.

Step S201: The base station receives a preceding matrix indication (PMI) value and reference signal received power (RSRP) that are sent by user equipment.

Step S202: The base station determines, based on the RSRP, a network area in which the user equipment is located.

A specific method for determining, based on the RSRP, the network area in which the user equipment is located may include: receiving, by the base station, an RSRP value list sent by a terminal; and if $RSRP_{max}$ is apparently greater than other RSRP values, extracting a network area corresponding to the greatest value, as the network area in which the UE is located; or if $RSRP_{max}$ and $RSRP_{max}$ (a second largest value) are apparently greater than other RSRP values, extracting an overlapped area of network areas corresponding to $RSRP_{max}$ and $RSRP_{max-1}$, as the network area in which the UE is located.

Step S203: If the user equipment is in an odd-numbered network area group, allocate an equivalent channel in a first channel group to the user equipment based on the PMI value; if the user equipment is in an even-numbered network area group, allocate a second channel group to the user equipment based on the PMI value; and if the user equipment is in an overlapped network area group, obtain a first network area corresponding to the largest value in the RSRP and a second network area corresponding to the second largest value in the RSRP, allocate a third channel to the user equipment based on the PMI value, and stop allocating equivalent channels to the first network area and the second network area, where a radio frequency channel occupied by the first channel group is different from a radio frequency channel occupied by the second channel group.

According to the method provided by the embodiment shown in FIG. 2, based on the PMI value reported by the UE, network areas are classified into three network area groups corresponding to the odd-numbered network area group, the even-numbered network area group, and the overlapped network area group respectively. PMI values that may appear in the three network areas are shown in FIG. 2A. For the UE, different channel groups are used for different network area groups, for example, data is transmitted in the odd-numbered network area group by using the equivalent channel in the first channel group, and data is transmitted in the even-numbered network area group by using the equivalent channel in the second channel group. In addition, a first radio frequency channel group in the first channel group for channel allocation is different from a second radio frequency channel group in the second channel group for channel allocation. In other words, there is no same radio frequency channel in the first radio frequency channel group and the second radio frequency channel group. Therefore, data transmission on different radio frequency channels can well avoid interference between an odd-numbered network area and an even-numbered network area that are adjacent to each other. In the overlapped network area group, a joint transmission manner, that is, the third channel group, is used to transmit data. It can be determined that the UE in the overlapped network area group is specifically in an overlapped area of the first network area and the second network area (that is, when the UE is in the overlapped area, a difference between RSRP 1 and RSRP 2 reported by the UE is much smaller, and the RSRP 1 and the RSRP 2 are the largest value and the second largest value in the RSRP) by using the RSRP reported by the UE. In this way, when the base station allocates the equivalent channel in the third channel group to the UE, the base station stops allocating equivalent channels to the first network area and the second network area. Because when the UE sends data on the equivalent channel in the third channel group, the base station stops allocating equivalent channels to network areas relatively close to the overlapped area (namely, the first network area and the second network area), the first network area and the second network area do not interfere with the overlapped area. As other network areas (network areas other than the first network area and the second network area) are far away from the overlapped area that is of the first network area and the second network area and in which the UE is located, the interference can be ignored.

Figure 3:
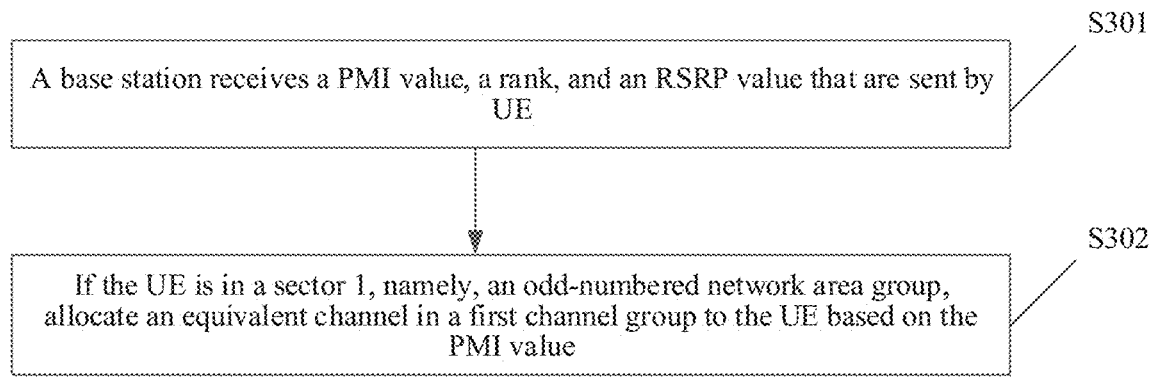
FIG. 3 is a schematic flowchart of a method for transmitting base station data according to another embodiment of this application.
Figure 3A:
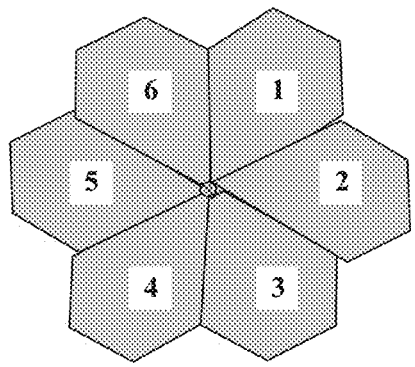
FIG. 3A is a schematic structural diagram of a network with six sectors.

FIG. 3 shows a method for transmitting base station data according to another embodiment of this application. The method is performed by a base station. As shown in FIG. 3, the method includes the following steps. The base station is provided with six sectors, and as shown in FIG. 3A, the six sectors are respectively a sector 1 to a sector 6, each sector is a conventional 2-antenna cell, each cell is provided with two ports, and the UE is an R8 terminal, that is, the UE may support a maximum of four ports. Certainly, in actual application, for example, the UE is an R10 terminal, and the UE may support a maximum of eight ports. As shown in FIG. 3, the method includes the following steps.

Step S301: The base station receives a PMI value, a rank, and an RSRP value that are sent by the UE.

Step S302: If the UE is in the sector 1 (that is, an odd-numbered network area group), allocate an equivalent channel in a first channel group to the UE based on the PMI value.

If PMI=0, and RANK=1, the base station allocates a first equivalent channel in the first channel group to the UE, and the first equivalent channel may be:

$$[T_0 \ \ldots \ T_{2M-1}]V\frac{1}{2}\begin{bmatrix}1\\1\\1\\1\end{bmatrix} = [T_0 \ \ldots \ T_{2M-1}]\frac{1}{\sqrt{2}}\begin{bmatrix}1\\1\\0\\0\\1\\1\\0\\0\\\vdots\end{bmatrix},$$

where $T_{2M-1}$ is a $(2M)^{th}$ network area, M is a quantity of radio frequency channels, and the ellipsis represents 2M−8 omitted digits. The 2M−8 digits are rows that are repeated in the foregoing matrix, and the rows indicates repeated digits in the first to the fourth rows, namely, 1100. The following ellipses represent a same meaning, only repeated digits may be different based on different matrices, for specific digits, refer to digits in the first four rows in the following matrices, and details are not described herein again.

A four-port mapping matrix V may be specifically:

$$V = \frac{1}{\sqrt{2}}\begin{bmatrix}1 & 0 & 1 & 0\\0 & 1 & 0 & 1\\j & 0 & -j & 0\\0 & j & 0 & -j\\1 & 0 & 1 & 0\\0 & 1 & 0 & 1\\j & 0 & -j & 0\\0 & j & 0 & -j\\\vdots & \vdots & \vdots & \vdots\end{bmatrix}.$$

The ellipsis represents 2M−8 omitted rows, and the 2M−8 rows repeat based on digits in the matrix V.

When PMI=2, a second equivalent channel in the first channel group and allocated to the user equipment is:

$$[T_0 \ \ldots \ T_{2M-1}]V\frac{1}{2}\begin{bmatrix}1\\-1\\1\\-1\end{bmatrix} = [T_0 \ \ldots \ T_{2M-1}]\frac{1}{\sqrt{2}}\begin{bmatrix}1\\-1\\0\\0\\1\\-1\\0\\0\\\vdots\end{bmatrix}.$$

When PMI=9, a third equivalent channel in the first channel group and allocated to the user equipment is:

$$[T_0 \ \ldots \ T_{2M-1}]V\frac{1}{2}\begin{bmatrix}1\\j\\1\\j\end{bmatrix} = [T_0 \ \ldots \ T_{2M-1}]\frac{1}{\sqrt{2}}\begin{bmatrix}1\\j\\0\\0\\1\\j\\0\\0\\\vdots\end{bmatrix}.$$

When PMI=11, a fourth equivalent channel in the first channel group and allocated to the user equipment is:

$$[T_0 \ \ldots \ T_{2M-1}]V\frac{1}{2}\begin{bmatrix}1\\-j\\1\\-j\end{bmatrix} = [T_0 \ \ldots \ T_{2M-1}]\frac{1}{\sqrt{2}}\begin{bmatrix}1\\-j\\0\\0\\1\\-j\\0\\0\\\vdots\end{bmatrix}.$$

Figure 3B:
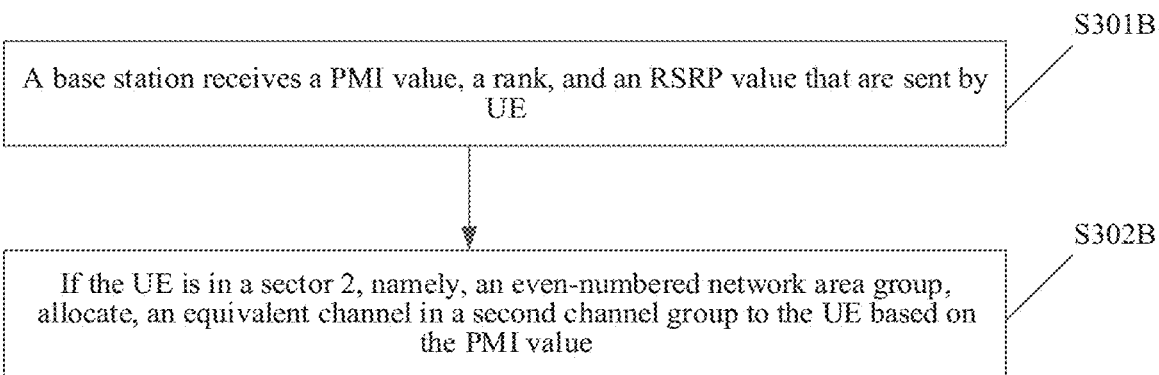
FIG. 3B is a schematic flowchart of another method for transmitting base station data according to another embodiment of this application.

FIG. 3B shows a method for transmitting base station data according to another embodiment of this application. The method is performed by a base station. As shown in FIG. 3B, the method includes the following steps. The base station is provided with six sectors, and as shown in FIG. 3A, the six sectors are respectively a sector 1 to a sector 6, each sector is a conventional 2-antenna cell, each cell is provided with two ports, and the UE is an R8 terminal, that is, the UE may support a maximum of four. Certainly, in actual application, for example, the UE is an R10 terminal, and the UE may support a maximum of eight ports. As shown in FIG. 3B, the method includes the following steps.

Step S301B: The base station receives a PMI value, a RANK, and an RSRP value that are sent by the UE.

Step S302B: If the UE is in the sector 2 (namely, an even-numbered network area group), allocate an equivalent channel in a second channel group to the UE based on the PMI value.

If PMI=1, and RANK=1, the base station allocates a fifth equivalent channel in the second channel group to the UE, and the fifth equivalent channel may be:

$$[T_0 \ \ldots \ T_{2M-1}]V\frac{1}{2}\begin{bmatrix}1\\j\\-1\\-j\end{bmatrix} = [T_0 \ \ldots \ T_{2M-1}]\frac{1}{\sqrt{2}}\begin{bmatrix}0\\0\\j\\-1\\0\\0\\j\\-1\\\vdots\end{bmatrix},$$

where
$T_{2M-1}$ is a $(2M)^{th}$ network area, V is a port mapping matrix of the user equipment, and the ellipsis represents 2M−8 repeated digits.

When PMI=3, a sixth equivalent channel in the second channel group and allocated to the user equipment is:

$$[T_0 \ \ldots \ T_{2M-1}]V\frac{1}{2}\begin{bmatrix}1\\-j\\-1\\j\end{bmatrix} = [T_0 \ \ldots \ T_{2M-1}]\frac{1}{\sqrt{2}}\begin{bmatrix}0\\0\\j\\1\\0\\0\\j\\1\\\vdots\end{bmatrix}.$$

When PMI=8, a seventh equivalent channel in the second channel group and allocated to the user equipment is:

$$[T_0 \ \ldots \ T_{2M-1}]V\frac{1}{2}\begin{bmatrix}1\\1\\-1\\-1\end{bmatrix} = [T_0 \ \ldots \ T_{2M-1}]\frac{1}{\sqrt{2}}\begin{bmatrix}0\\0\\1\\1\\0\\0\\1\\1\\\vdots\end{bmatrix}.$$

When PMI=10, an eighth equivalent channel in the second channel group and allocated to the user equipment is:

$$[T_0 \ \ldots \ T_{2M-1}]V\frac{1}{2}\begin{bmatrix}1\\-1\\-1\\1\end{bmatrix} = [T_0 \ \ldots \ T_{2M-1}]\frac{1}{\sqrt{2}}\begin{bmatrix}0\\0\\1\\-1\\0\\0\\1\\-1\\\vdots\end{bmatrix}.$$

Figure 3C:
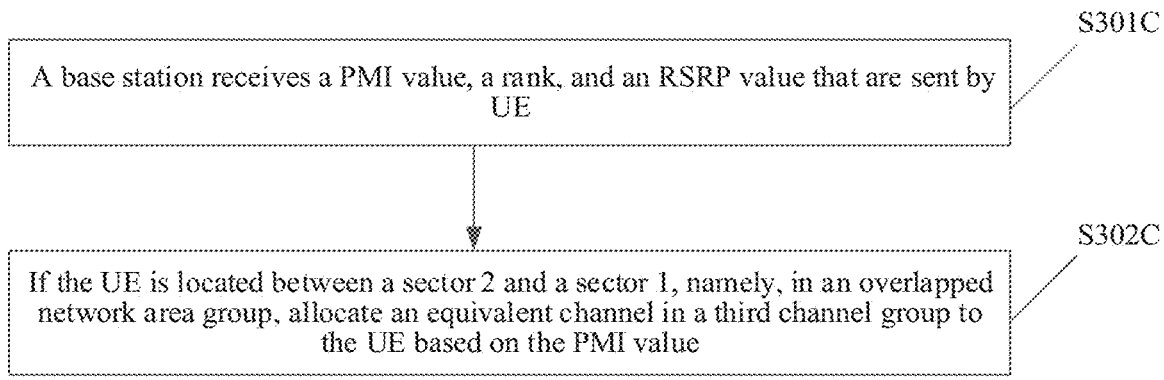
FIG. 3C is a schematic flowchart of still another method for transmitting base station data according to another embodiment of this application.

FIG. 3C shows a method for transmitting base station data according to another embodiment of this application. The method is performed by a base station. As shown in FIG. 3C, the method includes the following steps. The base station is provided with six sectors, and as shown in FIG. 3A, the six sectors are respectively a sector 1 to a sector 6, each sector is a conventional 2-antenna cell, each cell is provided with two ports, and the UE is an R8 terminal, that is, the UE may support a maximum of four ports. Certainly, in actual application, for example, the UE is an R10 terminal, and the UE may support a maximum of eight ports. As shown in FIG. 3C, the method includes the following steps.

Step S301C: The base station receives a PMI value, a RANK, and an RSRP value that are sent by the UE.

Step S302C: If the UE is located between the sector 2 and the sector 1 (namely, an overlapped network area group), allocate an equivalent channel in a third channel group to the UE based on the PMI value.

If PMI=4, and RANK=1, the base station allocates a ninth equivalent channel in the third channel group to the UE, and the ninth equivalent channel may be:

$$[T_0 \ \ldots \ T_{2M-1}]V\frac{1}{2}\begin{bmatrix}1\\\frac{1}{\sqrt{2}}(1+j)\\j\\-\frac{1}{\sqrt{2}}(1-j)\end{bmatrix} = [T_0 \ \ldots \ T_{2M-1}]\frac{1}{\sqrt{2}}\begin{bmatrix}\frac{1}{2}(1+j)\\\frac{1}{\sqrt{2}}j\\\frac{1}{2}(1+j)\\\frac{1}{\sqrt{2}}j\\\vdots\end{bmatrix},$$

where
$T_{2M-1}$ is a $(2M)^{th}$ network area, V is a port mapping matrix of the user equipment, and the ellipsis represents 2M−8 repeated digits.

When PMI=5, a tenth equivalent channel in the third channel group and allocated to the user equipment is:

$$[T_0 \ \ldots \ T_{2M-1}]V\frac{1}{2}\begin{bmatrix}1\\-\frac{1}{\sqrt{2}}(1+j)\\j\\\frac{1}{\sqrt{2}}(1-j)\end{bmatrix} = [T_0 \ \ldots \ T_{2M-1}]\frac{1}{\sqrt{2}}\begin{bmatrix}\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\vdots\end{bmatrix}.$$

When PMI=6, an eleventh equivalent channel in the third channel group and allocated to the user equipment is:

$$[T_0 \ \ldots \ T_{2M-1}]V\frac{1}{2}\begin{bmatrix}1\\-\frac{1}{\sqrt{2}}(1-j)\\-j\\\frac{1}{\sqrt{2}}(1+j)\end{bmatrix} = [T_0 \ \ldots \ T_{2M-1}]\frac{1}{\sqrt{2}}\begin{bmatrix}\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\vdots\end{bmatrix}.$$

When PMI=7, a twelfth equivalent channel in the third channel group and allocated to the user equipment is:

$$[T_0 \ \ldots \ T_{2M-1}]V\frac{1}{2}\begin{bmatrix}1\\\frac{1}{\sqrt{2}}(1-j)\\-j\\-\frac{1}{\sqrt{2}}(1+j)\end{bmatrix} = [T_0 \ \ldots \ T_{2M-1}]\frac{1}{\sqrt{2}}\begin{bmatrix}\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\vdots\end{bmatrix},$$

When PMI=12, a thirteenth equivalent channel in the third channel group and allocated to the user equipment is:

$$[T_0 \ \ldots \ T_{2M-1}]V\frac{1}{2}\begin{bmatrix}1\\1\\1\\-1\end{bmatrix} = [T_0 \ \ldots \ T_{2M-1}]\frac{1}{\sqrt{2}}\begin{bmatrix}1\\0\\0\\j\\1\\0\\0\\j\\\vdots\end{bmatrix}.$$

When PMI=13, a fourteenth equivalent channel in the third channel group and allocated to the user equipment is:

$$[T_0 \quad \ldots \quad T_{2M-1}]V\frac{1}{2}\begin{bmatrix}1\\1\\-1\\1\end{bmatrix} = [T_0 \quad \ldots \quad T_{2M-1}]\frac{1}{\sqrt{2}}\begin{bmatrix}0\\1\\j\\0\\0\\1\\j\\0\\\vdots\end{bmatrix}.$$

When PMI=14, a fifteenth equivalent channel in the third channel group and allocated to the user equipment is:

$$[T_0 \quad \ldots \quad T_{2M-1}]V\frac{1}{2}\begin{bmatrix}-1\\1\\1\\1\end{bmatrix} = [T_0 \quad \ldots \quad T_{2M-1}]\frac{1}{\sqrt{2}}\begin{bmatrix}0\\1\\-j\\0\\0\\1\\-j\\0\\\vdots\end{bmatrix}.$$

When PMI=15, a sixteenth equivalent channel in the third channel group and allocated to the user equipment is:

$$[T_0 \quad \ldots \quad T_{2M-1}]V\frac{1}{2}\begin{bmatrix}1\\-1\\-1\\-1\end{bmatrix} = [T_0 \quad \ldots \quad T_{2M-1}]\frac{1}{\sqrt{2}}\begin{bmatrix}0\\-1\\j\\0\\0\\-1\\j\\0\\\vdots\end{bmatrix}.$$

Equivalent channels in the third channel group belong to joint transmission, and for the UE under the joint transmission, the base station can perform open-loop SU-MIMO transmission in a V4T4R mode, and a quantity of transmission layers in this transmission mode may reach a maximum of four layers.

In the embodiment shown in FIG. 3, different radio frequency channels are used as the first equivalent channel and the second equivalent channel to transmit data. Therefore, the sector 1, the sector 3, and the sector 5 that correspond to the first equivalent channel do not interfere with the sector 2, the sector 4, and the sector 6 that correspond to the second equivalent channel. Although a same equivalent channel is used to transmit data, there is no interference between the sector 1 and the sector 3 because a distance between the two sectors is relatively long. In the same way, there is no interference between odd-numbered sectors or between even-numbered sectors either.

The following takes three UEs as a practical example for description. The three UEs are respectively UE 1, UE 2, and UE 3. The UE 1 is in an intermediate area of the sector 1, the UE 2 is in an intermediate area of the sector 2, and the UE 3 is in an intermediate area of the sector 3. The base station receives PMI=0 returned by the UE 1, receives PMI=1 returned by the UE 2, and receives PMI=2 returned by the UE 3. Then the base station allocates the first equivalent channel to the UE 1 and the UE 3, and allocates the second equivalent channel to the UE 2. The UE 1 and the UE 3 that are adjacent to the UE 2 use different radio frequency channels to transmit data. Therefore, there is no interference between the UE 2 and the UE 1. In the same way, there is also no interference between the UE 2 and the UE 3. For the UE 1 and the UE 3, since the sector 1 is separated from the sector 3 by the sector 2, there is no overlapped area between the sector 1 and the sector 3. Therefore, even if the UE 1 and the UE 3 use a same radio frequency channel to transmit data, there is no interference between the UE 1 and the UE 3. Therefore, the embodiment shown in FIG. 3 has an advantage of avoiding interference between network areas.

Figure 3D:
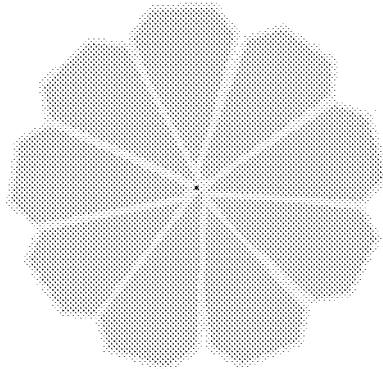
FIG. 3D is a schematic structural diagram of a network nine sectors.

FIG. 3D is a schematic structural diagram of a network including a single station with nine sectors. As shown in FIG. 3D, for ease of description, the nine sectors are named as a sector 1 to a sector 9. For the nine sectors, a manner of allocating an equivalent channel to UE by the base station is in consistent with that for the six sectors, a difference lies only in that the sector 1 and the sector 9 are combined into one sector to perform equivalent channel allocation.

Figure 4:
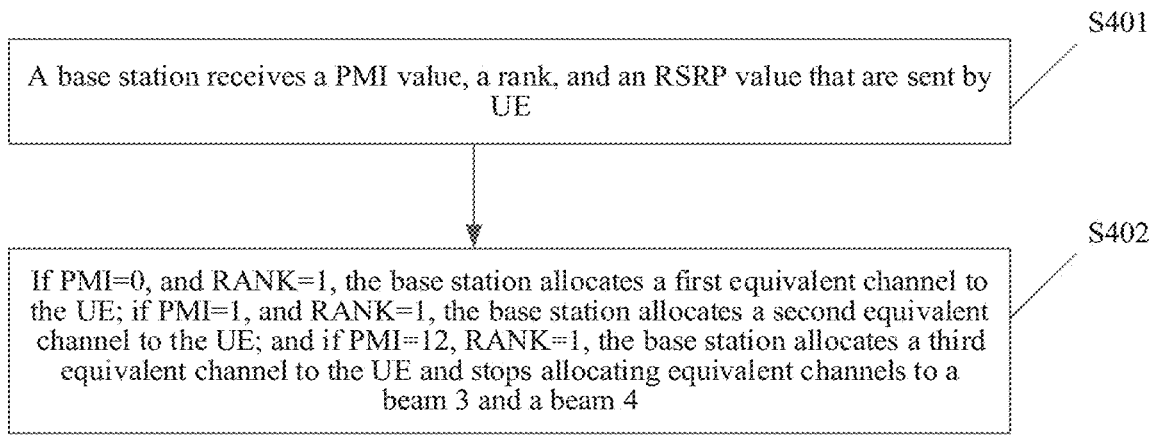
FIG. 4 is a schematic flowchart of a method for transmitting base station data according to an embodiment of this application.
Figure 4A:
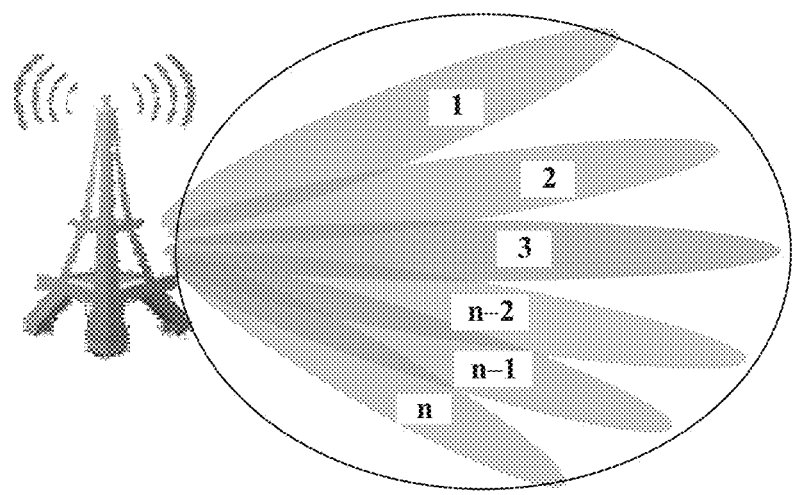
FIG. 4A is a schematic structural diagram of a network with six beams.

The sector in the embodiment shown in FIG. 3, FIG. 3B, and FIG. 3C may alternatively be replaced with a beam, a schematic diagram of a beam distribution is shown in FIG. 4, and as shown in FIG. 4, an expression form of the network area is a beam. Steps of a method for transmitting base station data in the network area shown in FIG. 4 are the same as steps shown in FIG. 2, FIG. 3, FIG. 3B, or FIG. 3C, provided that the sector is replaced with the beam, and details are not described herein again.

Figure 5:
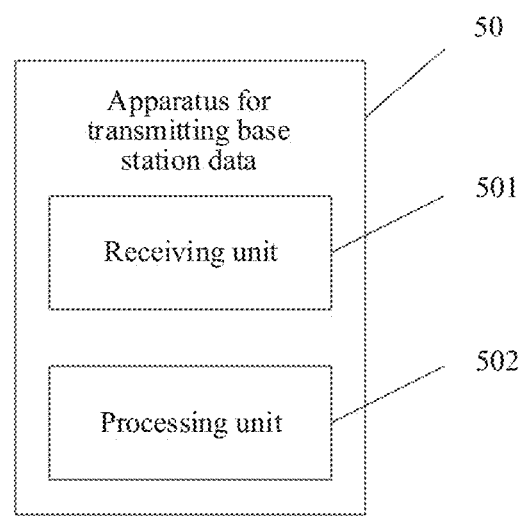
FIG. 5 is a schematic structural diagram of an apparatus for transmitting base station data according to this application.

FIG. 5 shows an apparatus 50 for transmitting base station data, and the apparatus includes: a receiving unit 501, configured to receive a precoding matrix indication PMI value and reference signal received power RSRP that are sent by user equipment; and a processing unit 502, configured to: determine, based on the RSRP, a network area in which the user equipment is located; if the user equipment is in an odd-numbered network area group, allocate an equivalent channel in a first channel group to the user equipment based on the PMI value; if the user equipment is in an even-numbered network area group, allocate an equivalent channel in a second channel group to the user equipment based on the PMI value; and if the user equipment is in an overlapped network area group, obtain a first network area corresponding to a largest value in the RSRP and a second network area corresponding to a second largest value in the RSRP, allocate an equivalent channel in a third channel group to the user equipment based on the PMI value, and stop allocating equivalent channels to the first network area and the second network area, where a radio frequency channel occupied by the first channel group is different from a radio frequency channel occupied by the second channel group.

Optionally, the foregoing network area may be specifically a sector or a beam.

Optionally, for an expression form of a specific channel in the foregoing equivalent channels, refer to FIG. 2, FIG. 3, FIG. 3B, or FIG. 3C, and details are not described herein again.

According to the apparatus provided in FIG. 5, network areas are classified into three area groups, and radio frequency channels are allocated to the three area groups. In this way, devices in the three area groups do not interfere with each other through allocation of the radio frequency channels, thereby reducing interference between network areas.

Figure 6:
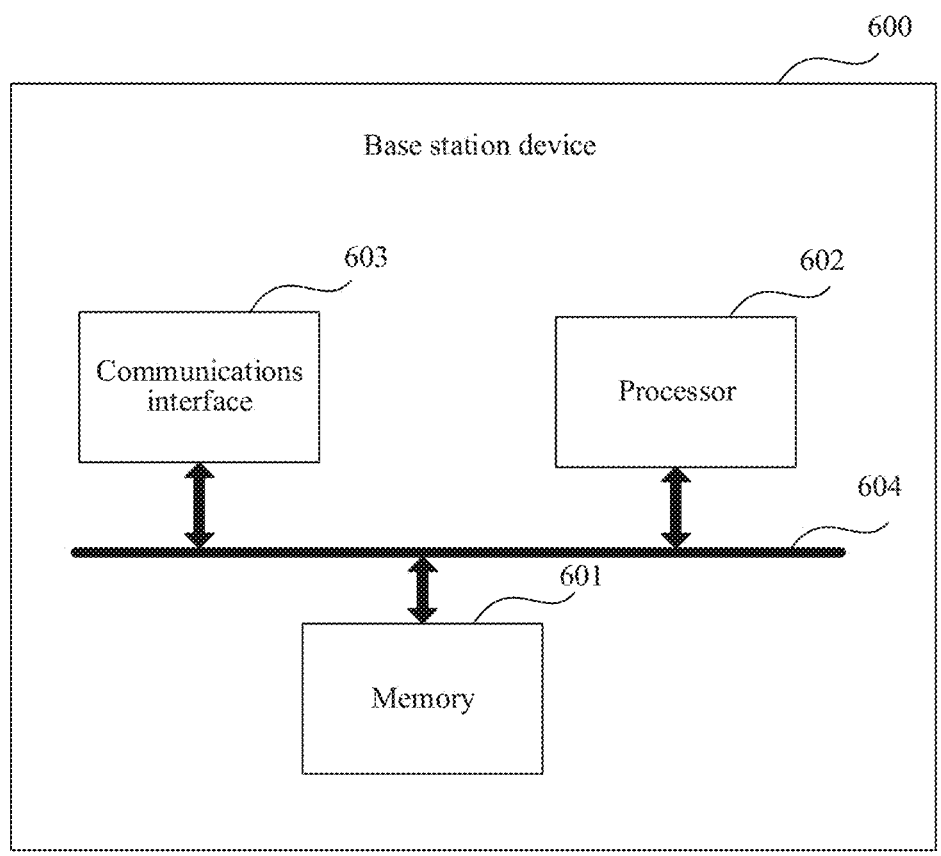
FIG. 6 is a schematic structural diagram of hardware of a base station device according to this application.

FIG. 6 further shows a base station device according to an embodiment of this application. The base station device 600 includes a processing unit 602 and a communications unit 603. The processing unit 602 is configured to control and manage an action of the base station device. For example, the processing unit 602 can be configured to support the communications unit 603 in receiving a precoding matrix indication PMI value and reference signal received power RSRP that are sent by user equipment, and support the base station device in: determining, based on the RSRP, a network area in which the user equipment is located; if the user equipment is in an odd-numbered network area group, allocating an equivalent channel in a first channel group to the user equipment based on the PMI value; if the user equipment is in an even-numbered network area group, allocating an equivalent channel in a second channel group to the user equipment based on the PMI value; and if the user equipment is in an overlapped network area group, obtaining a first network area corresponding to a largest value in the RSRP and a second network area corresponding to a second largest value in the RSRP, allocating an equivalent channel in a third channel group to the user equipment based on the PMI value, and stopping allocating equivalent channels to the first network area and the second network area, where a radio frequency channel occupied by the first channel group is different from a radio frequency channel occupied by the second channel group. A base station device may further include a storage unit 601, configured to store program code and data of the base station device.

The processing unit 602 may be a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The controller/processor may implement or execute various example logical blocks, modules, and circuits described with reference to content disclosed in the present invention. Alternatively, the processor may be a combination of processors implementing a computing function, for example, one microprocessor or a combination of a plurality of microprocessors, or a combination of a DSP and a microprocessor. The communications unit 603 may be a communications interface, a transceiver, a transceiver circuit, or the like, where the communications interface is a general term and may include one or more interfaces. The storage unit 601 may be a memory.

When the processing unit 602 is a processor, the communications unit 603 is a communications interface.

An embodiment of this application further provides a computer-readable storage medium, storing a computer program used to exchange electronic data, where the computer program enables a computer to perform the method provided in FIG. 2, FIG. 3, FIG. 3B, or FIG. 3C.

An embodiment of this application further provides a computer program product, including a non-transitory computer-readable storage medium that stores a computer program, where the computer program is run to enable a computer to perform the method provided in FIG. 2, FIG. 3, FIG. 3B, or FIG. 3C.

It should be noted that, for brief description, all the foregoing method embodiments are expressed as a series of action combinations. However, a person skilled in the art should appreciate that the present invention is not limited to the described action sequence, because according to the present invention, some steps may be performed in other sequences or performed simultaneously. In addition, a person skilled in the art should also appreciate that all the embodiments described in this specification are example embodiments, and the related actions and modules are not necessarily mandatory to the present invention.

In the foregoing embodiments, the descriptions of the embodiment have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely a logical function division and may be another division in an actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between the apparatuses or units may be implemented in electronic or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present invention essentially, or the part contributing to the prior art, or all or some of the technical solutions may be implemented in the form of a software product. The software product is stored in a memory and includes several instructions for instructing a computer device (which may be a personal computer, a server, a network device, or the like) to perform all or some of the steps of the methods described in the embodiments of the present invention. The foregoing memory includes any medium that can store a program code, such as a USB flash drive, a read-only memory (ROM), a random access memory (RAM), a removable hard disk, a magnetic disk, or an optical disc.

What is disclosed above is merely an example embodiment of the present invention, and certainly is not intended to limit the scope of the claims of the present invention. A person of ordinary skill in the art may understand that all or some of processes that implement the foregoing embodiments and equivalent modifications made in accordance with the claims of the present invention shall fall within the scope of the present invention.

What is claimed is:

1. A method for transmitting base station data, comprising:
- receiving a precoding matrix indication (PMI) value and reference signal received power (RSRP) from user equipment;
- determining, based on the RSRP, a network area in which the user equipment is located;
- if the user equipment is in an odd-numbered network area group, allocating a channel in a first channel group to the user equipment based on the PMI value;
- if the user equipment is in an even-numbered network area group, allocating a channel in a second channel group to the user equipment based on the PMI value; and
- if the user equipment is in an overlapped network area group, obtaining a first network area corresponding to a largest value in the RSRP and a second network area corresponding to a second largest value in the RSRP;
- allocating a channel in a third channel group to the user equipment based on the PMI value; and
- stopping allocating channels to the first network area and the second network area, wherein
- a radio frequency channel occupied by the first channel group is different from a radio frequency channel occupied by the second channel group.

2. The method according to claim 1, wherein the network area is a sector or a beam.

3. The method according to claim 1, wherein
if the user equipment is in the odd-numbered network area group,
in response to PMI=0, the channel in the first channel group allocated to the user equipment comprises a first channel:

$$[T_0 \ \ldots \ T_{2M-1}]V\frac{1}{2}\begin{bmatrix}1\\1\\1\\1\end{bmatrix} = [T_0 \ \ldots \ T_{2M-1}]\frac{1}{\sqrt{2}}\begin{bmatrix}1\\1\\0\\0\\1\\1\\0\\0\\\vdots\end{bmatrix},$$

wherein
$T_{2M-1}$ represents a $(2M)^{th}$ network area, V represents a port mapping matrix of the user equipment, and the ellipsis represents 2M−8 repeated digits;
in response to PMI=2, the channel in the first channel group allocated to the user equipment comprises a second channel:

$$[T_0 \ \ldots \ T_{2M-1}]V\frac{1}{2}\begin{bmatrix}1\\-1\\1\\-1\end{bmatrix} = [T_0 \ \ldots \ T_{2M-1}]\frac{1}{\sqrt{2}}\begin{bmatrix}1\\-1\\0\\0\\1\\-1\\0\\0\\\vdots\end{bmatrix};$$

in response to PMI=9, the channel in the first channel group allocated to the user equipment comprises a third channel:

$$[T_0 \ \ldots \ T_{2M-1}]V\frac{1}{2}\begin{bmatrix}1\\j\\1\\j\end{bmatrix} = [T_0 \ \ldots \ T_{2M-1}]\frac{1}{\sqrt{2}}\begin{bmatrix}1\\j\\0\\0\\1\\j\\0\\0\\\vdots\end{bmatrix};$$

in response to PMI=11, the channel in the first channel group allocated to the user equipment comprises a fourth channel:

$$[T_0 \ \ldots \ T_{2M-1}]V\frac{1}{2}\begin{bmatrix}1\\-j\\1\\-j\end{bmatrix} = [T_0 \ \ldots \ T_{2M-1}]\frac{1}{\sqrt{2}}\begin{bmatrix}1\\-j\\0\\0\\1\\-j\\0\\0\\\vdots\end{bmatrix}.$$

4. The method according to claim 1, wherein
if the user equipment is in the even-numbered network area group,
in response to PMI=1, the channel in the second channel group allocated to the user equipment comprises a fifth channel:

$$[T_0 \ \ldots \ T_{2M-1}]V\frac{1}{2}\begin{bmatrix}1\\j\\-1\\-j\end{bmatrix} = [T_0 \ \ldots \ T_{2M-1}]\frac{1}{\sqrt{2}}\begin{bmatrix}0\\0\\j\\-1\\0\\0\\j\\-1\\\vdots\end{bmatrix},$$

wherein
$T_{2M-1}$ represents a $(2M)^{th}$ network area, V represents a port mapping matrix of the user equipment, and the ellipsis represents 2M−8 repeated digits;
in response to PMI=3, the channel in the second channel group allocated to the user equipment comprises a sixth channel:

$$[T_0 \ldots T_{2M-1}]V\frac{1}{2}\begin{bmatrix}1\\-j\\-1\\j\end{bmatrix} = [T_0 \ldots T_{2M-1}]\frac{1}{\sqrt{2}}\begin{bmatrix}0\\0\\j\\1\\0\\0\\j\\1\\\vdots\end{bmatrix};$$

in response to PMI=8, the channel in the second channel group allocated to the user equipment comprises a seventh channel:

$$[T_0 \ldots T_{2M-1}]V\frac{1}{2}\begin{bmatrix}1\\1\\-1\\-1\end{bmatrix} = [T_0 \ldots T_{2M-1}]\frac{1}{\sqrt{2}}\begin{bmatrix}0\\0\\1\\1\\0\\0\\1\\1\\\vdots\end{bmatrix};$$

and in response to PMI=10, the channel in the second channel group allocated to the user equipment comprises an eighth channel:

$$[T_0 \ldots T_{2M-1}]V\frac{1}{2}\begin{bmatrix}1\\-1\\-1\\1\end{bmatrix} = [T_0 \ldots T_{2M-1}]\frac{1}{\sqrt{2}}\begin{bmatrix}0\\0\\1\\-1\\0\\0\\1\\-1\\\vdots\end{bmatrix}.$$

5. The method according to claim 1, wherein if the user equipment is in the overlapped network area group, response to PMI=4, the channel in the third channel group allocated to the user equipment comprises a ninth channel:

$$[T_0 \ldots T_{2M-1}]V\frac{1}{2}\begin{bmatrix}1\\\frac{1}{\sqrt{2}}(1+j)\\j\\-\frac{1}{\sqrt{2}}(1-j)\end{bmatrix} = [T_0 \ldots T_{2M-1}]\frac{1}{\sqrt{2}}\begin{bmatrix}\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\vdots\end{bmatrix},$$

wherein $T_{2M-1}$ represents a $(2M)^{th}$ network area, V represents a port mapping matrix of the user equipment, and the ellipsis represents 2M−8 repeated digits;

in response to PMI=5, the channel in the third channel group allocated to the user equipment comprises a tenth channel:

$$[T_0 \ldots T_{2M-1}]V\frac{1}{2}\begin{bmatrix}1\\-\frac{1}{\sqrt{2}}(1-j)\\-j\\\frac{1}{\sqrt{2}}(1+j)\end{bmatrix} = [T_0 \ldots T_{2M-1}]\frac{1}{\sqrt{2}}\begin{bmatrix}\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\vdots\end{bmatrix};$$

in response to PMI=6, the channel in the third channel group allocated to the user equipment comprises an eleventh channel:

$$[T_0 \ \ldots \ T_{2M-1}]V\frac{1}{2}\begin{bmatrix} 1 \\ -\frac{1}{\sqrt{2}}(1+j) \\ j \\ \frac{1}{\sqrt{2}}(1-j) \end{bmatrix} = [T_0 \ \ldots \ T_{2M-1}]\frac{1}{\sqrt{2}}\begin{bmatrix} \frac{1}{2}(1+j) \\ -\frac{1}{\sqrt{2}}j \\ \frac{1}{2}(1+j) \\ -\frac{1}{\sqrt{2}}j \\ \frac{1}{2}(1+j) \\ -\frac{1}{\sqrt{2}}j \\ \frac{1}{2}(1+j) \\ -\frac{1}{\sqrt{2}}j \\ \vdots \end{bmatrix};$$

in response to PMI=7, the channel in the third channel group allocated to the user equipment comprises a twelfth channel:

$$[T_0 \ \ldots \ T_{2M-1}]V\frac{1}{2}\begin{bmatrix} 1 \\ \frac{1}{\sqrt{2}}(1-j) \\ -j \\ -\frac{1}{\sqrt{2}}(1+j) \end{bmatrix} = [T_0 \ \ldots \ T_{2M-1}]\frac{1}{\sqrt{2}}\begin{bmatrix} \frac{1}{2}(1-j) \\ -\frac{1}{\sqrt{2}}j \\ \frac{1}{2}(1-j) \\ \frac{1}{\sqrt{2}}j \\ \frac{1}{2}(1-j) \\ -\frac{1}{\sqrt{2}}j \\ \frac{1}{2}(1-j) \\ \frac{1}{\sqrt{2}}j \\ \vdots \end{bmatrix};$$

in response to PMI=12, the channel in the third channel group allocated to the user equipment comprises a thirteenth channel $$[T_0 \ \ldots \ T_{2M-1}]V\frac{1}{2}\begin{bmatrix} 1 \\ 1 \\ 1 \\ -1 \end{bmatrix} = [T_0 \ \ldots \ T_{2M-1}]\frac{1}{\sqrt{2}}\begin{bmatrix} 1 \\ 0 \\ 0 \\ j \\ 1 \\ 0 \\ 0 \\ j \\ \vdots \end{bmatrix};$$

in response to PMI=13, the channel in the third channel group allocated to the user equipment comprises a fourteenth channel:

$$[T_0 \ \ldots \ T_{2M-1}]V\frac{1}{2}\begin{bmatrix} 1 \\ 1 \\ -1 \\ 1 \end{bmatrix} = [T_0 \ \ldots \ T_{2M-1}]\frac{1}{\sqrt{2}}\begin{bmatrix} 0 \\ 1 \\ j \\ 0 \\ 0 \\ 1 \\ j \\ 0 \\ \vdots \end{bmatrix};$$

in response to PMI=14, the channel in the third channel group allocated to the user equipment comprises a fifteenth channel:

$$[T_0 \ \ldots \ T_{2M-1}]V\frac{1}{2}\begin{bmatrix} -1 \\ 1 \\ 1 \\ 1 \end{bmatrix} = [T_0 \ \ldots \ T_{2M-1}]\frac{1}{\sqrt{2}}\begin{bmatrix} 0 \\ 1 \\ -j \\ 0 \\ 0 \\ 1 \\ -j \\ 0 \\ \vdots \end{bmatrix};$$

and in response to PMI=15, the channel in the third channel group allocated to the user equipment comprises a sixteenth channel:

$$[T_0 \ \ldots \ T_{2M-1}]V\frac{1}{2}\begin{bmatrix} 1 \\ -1 \\ -1 \\ -1 \end{bmatrix} = [T_0 \ \ldots \ T_{2M-1}]\frac{1}{\sqrt{2}}\begin{bmatrix} 0 \\ -1 \\ j \\ 0 \\ 0 \\ -1 \\ j \\ 0 \\ \vdots \end{bmatrix}.$$

6. An apparatus for transmitting base station data, comprising:
a receiver configured to receive a precoding matrix indication (PMI) value and reference signal received power (RSRP) that are sent by user equipment; and
at least one processor coupled to a non-transitory computer-readable storage medium storing programming instructions for execution by the at least one processor, wherein the programming instructions instruct the apparatus to:
determine, based on the RSRP, a network area in which the user equipment is located;
if the user equipment is in an odd-numbered network area group, allocate a channel in a first channel group to the user equipment based on the PMI value;
if the user equipment is in an even-numbered network area group, allocate a channel in a second channel group to the user equipment based on the PMI value; and
if the user equipment is in an overlapped network area group, obtain a first network area corresponding to a largest value in the RSRP and a second network area corresponding to a second largest value in the RSRP, allocate a channel in a third channel group to the user equipment based on the PMI value, and stop allocating channels to the first network area and the second network area, wherein a radio frequency channel occupied by the first channel group is different from a radio frequency channel occupied by the second channel group.

7. The apparatus according to claim 6, wherein the network area is a sector or a beam.

8. The apparatus according to claim 6, wherein if the user equipment is in the odd-numbered network area group,
in response to PMI=0, the channel in the first channel group allocated to the user equipment comprises a first channel $$[T_0 \ \ldots \ T_{2M-1}]V\frac{1}{2}\begin{bmatrix}1\\1\\1\\1\end{bmatrix} = [T_0 \ \ldots \ T_{2M-1}]\frac{1}{\sqrt{2}}\begin{bmatrix}1\\1\\0\\0\\1\\1\\0\\0\\\vdots\end{bmatrix},$$

wherein
$T_{2M-1}$ represents a $(2M)^{th}$ network area, V represents a port mapping matrix of the user equipment, and the ellipsis represents 2M−8 repeated digits;
in response to PMI=2, the channel in the first channel group allocated to the user equipment comprises a second channel:

$$[T_0 \ \ldots \ T_{2M-1}]V\frac{1}{2}\begin{bmatrix}1\\-1\\1\\-1\end{bmatrix} = [T_0 \ \ldots \ T_{2M-1}]\frac{1}{\sqrt{2}}\begin{bmatrix}1\\-1\\0\\0\\1\\-1\\0\\0\\\vdots\end{bmatrix};$$

in response to PMI=9, the channel in the first channel group allocated to the user equipment comprises a third channel:

$$[T_0 \ \ldots \ T_{2M-1}]V\frac{1}{2}\begin{bmatrix}1\\j\\1\\j\end{bmatrix} = [T_0 \ \ldots \ T_{2M-1}]\frac{1}{\sqrt{2}}\begin{bmatrix}1\\j\\0\\0\\1\\j\\0\\0\\\vdots\end{bmatrix};$$

and
in response to PMI=11, the channel in the first channel group allocated to the user equipment comprises a fourth channel:

$$[T_0 \ \ldots \ T_{2M-1}]V\frac{1}{2}\begin{bmatrix}1\\-j\\1\\-j\end{bmatrix} = [T_0 \ \ldots \ T_{2M-1}]\frac{1}{\sqrt{2}}\begin{bmatrix}1\\-j\\0\\0\\1\\-j\\0\\0\\\vdots\end{bmatrix}.$$

9. The apparatus according to claim 6, wherein
if the user equipment is in the even-numbered network area group,
in response to PMI=1, the channel in the second channel group allocated to the user equipment comprises a fifth channel:

$$[T_0 \ \ldots \ T_{2M-1}]V\frac{1}{2}\begin{bmatrix}1\\j\\-1\\-j\end{bmatrix} = [T_0 \ \ldots \ T_{2M-1}]\frac{1}{\sqrt{2}}\begin{bmatrix}0\\0\\j\\-1\\0\\0\\j\\-1\\\vdots\end{bmatrix},$$

wherein
$T_{2M-1}$ represents a $(2M)^{th}$ network area, V represents a port mapping matrix of the user equipment, and the ellipsis represents 2M−8 repeated digits;
in response to PMI=3, the channel in the second channel group allocated to the user equipment comprises a sixth channel:

$$[T_0 \ \ldots \ T_{2M-1}]V\frac{1}{2}\begin{bmatrix}1\\-j\\-1\\j\end{bmatrix} = [T_0 \ \ldots \ T_{2M-1}]\frac{1}{\sqrt{2}}\begin{bmatrix}0\\0\\j\\1\\0\\0\\j\\1\\\vdots\end{bmatrix};$$

in response to PMI=8, the channel in the second channel group allocated to the user equipment comprises a seventh channel:

$$[T_0 \ \ldots \ T_{2M-1}]V\frac{1}{2}\begin{bmatrix}1\\1\\-1\\-1\end{bmatrix} = [T_0 \ \ldots \ T_{2M-1}]\frac{1}{\sqrt{2}}\begin{bmatrix}0\\0\\1\\1\\0\\0\\1\\1\\\vdots\end{bmatrix};$$

and in response to PMI=10, the channel in the second channel group allocated to the user equipment comprises an eighth channel:

$$[T_0 \ \ldots \ T_{2M-1}]V\frac{1}{2}\begin{bmatrix}1\\-1\\-1\\1\end{bmatrix} = [T_0 \ \ldots \ T_{2M-1}]\frac{1}{\sqrt{2}}\begin{bmatrix}0\\0\\1\\-1\\0\\0\\1\\-1\\\vdots\end{bmatrix}.$$

10. The apparatus according to claim 6, wherein
if the user equipment is in the overlapped network area group,
in response to PMI=4, the channel in the third channel group allocated to the user equipment comprises a ninth channel:

$$[T_0 \ \ldots \ T_{2M-1}]V\frac{1}{2}\begin{bmatrix}1\\\frac{1}{\sqrt{2}}(1+j)\\j\\-\frac{1}{\sqrt{2}}(1-j)\end{bmatrix} = [T_0 \ \ldots \ T_{2M-1}]\frac{1}{\sqrt{2}}\begin{bmatrix}\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\vdots\end{bmatrix},$$

wherein
$T_{2M-1}$ represents a $(2M)^{th}$ network area, V represents a port mapping matrix of the user equipment, and the ellipsis represents 2M−8 repeated digits;

in response to PMI=5, the channel in the third channel group allocated to the user equipment comprises a tenth channel:

$$[T_0 \ \ldots \ T_{2M-1}]V\frac{1}{2}\begin{bmatrix}1\\-\frac{1}{\sqrt{2}}(1-j)\\-j\\\frac{1}{\sqrt{2}}(1+j)\end{bmatrix} = [T_0 \ \ldots \ T_{2M-1}]\frac{1}{\sqrt{2}}\begin{bmatrix}\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\vdots\end{bmatrix};$$

in response to PMI=6, the channel in the third channel group allocated to the user equipment comprises an eleventh channel:

$$[T_0 \ \ldots \ T_{2M-1}]V\frac{1}{2}\begin{bmatrix}1\\-\frac{1}{\sqrt{2}}(1+j)\\j\\\frac{1}{\sqrt{2}}(1-j)\end{bmatrix} = [T_0 \ \ldots \ T_{2M-1}]\frac{1}{\sqrt{2}}\begin{bmatrix}\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\vdots\end{bmatrix};$$

in response to PMI=7, the channel in the third channel group allocated to the user equipment comprises a twelfth channel:

$$[T_0 \ \ldots \ T_{2M-1}]V\frac{1}{2}\begin{bmatrix}1\\ \frac{1}{\sqrt{2}}(1-j)\\ -j\\ -\frac{1}{\sqrt{2}}(1+j)\end{bmatrix} = [T_0 \ \ldots \ T_{2M-1}]\frac{1}{\sqrt{2}}\begin{bmatrix}\frac{1}{2}(1-j)\\ -\frac{1}{\sqrt{2}}j\\ \frac{1}{2}(1-j)\\ \frac{1}{\sqrt{2}}j\\ \frac{1}{2}(1-j)\\ -\frac{1}{\sqrt{2}}j\\ \frac{1}{2}(1-j)\\ \frac{1}{\sqrt{2}}j\\ \vdots\end{bmatrix};$$

in response to PMI=12, the channel in the third channel group allocated to the user equipment comprises a thirteenth channel:

$$[T_0 \ \ldots \ T_{2M-1}]V\frac{1}{2}\begin{bmatrix}1\\ 1\\ 1\\ -1\end{bmatrix} = [T_0 \ \ldots \ T_{2M-1}]\frac{1}{\sqrt{2}}\begin{bmatrix}1\\ 0\\ 0\\ j\\ 1\\ 0\\ 0\\ j\\ \vdots\end{bmatrix};$$

in response to PMI=13, the channel in the third channel group allocated to the user equipment comprises a fourteenth channel:

$$[T_0 \ \ldots \ T_{2M-1}]V\frac{1}{2}\begin{bmatrix}1\\ 1\\ -1\\ 1\end{bmatrix} = [T_0 \ \ldots \ T_{2M-1}]\frac{1}{\sqrt{2}}\begin{bmatrix}0\\ 1\\ j\\ 0\\ 0\\ 1\\ j\\ 0\\ \vdots\end{bmatrix};$$

in response to PMI=14, the channel in the third channel group allocated to the user equipment comprises a fifteenth channel:

$$[T_0 \ \ldots \ T_{2M-1}]V\frac{1}{2}\begin{bmatrix}-1\\ 1\\ 1\\ 1\end{bmatrix} = [T_0 \ \ldots \ T_{2M-1}]\frac{1}{\sqrt{2}}\begin{bmatrix}0\\ 1\\ -j\\ 0\\ 0\\ 1\\ -j\\ 0\\ \vdots\end{bmatrix};$$

and
in response to PMI=15, the channel in the third channel group allocated to the user equipment comprises a sixteenth channel:

$$[T_0 \ \ldots \ T_{2M-1}]V\frac{1}{2}\begin{bmatrix}1\\ -1\\ -1\\ -1\end{bmatrix} = [T_0 \ \ldots \ T_{2M-1}]\frac{1}{\sqrt{2}}\begin{bmatrix}0\\ -1\\ j\\ 0\\ 0\\ -1\\ j\\ 0\\ \vdots\end{bmatrix}.$$

11. A base station device, comprising:
a transceiver;
a non-transitory computer-readable storage medium; and
at least one processor coupled to the transceiver and the non-transitory computer-readable storage medium that stores programming instructions for execution by the at least one processor, wherein the programming instructions instruct the base station device to:
receive a precoding matrix indication (PMI) value and reference signal received power (RSRP) that are sent by user equipment; and
determine, based on the RSRP, a network area in which the user equipment is located;
if the user equipment is in an odd-numbered network area group, allocate a channel in a first channel group to the user equipment based on the PMI value;
if the user equipment is in an even-numbered network area group, allocate a channel in a second channel group to the user equipment based on the PMI value; and
if the user equipment is in an overlapped network area group, obtain a first network area corresponding to a largest value in the RSRP and a second network area corresponding to a second largest value in the RSRP, allocate a channel in a third channel group to the user equipment based on the PMI value, and stop allocating channels to the first network area and the second network area, wherein a radio frequency channel occupied by the first channel group is different from a radio frequency channel occupied by the second channel group.

12. The base station device according to claim 11, wherein the network area is a sector or a beam.

13. The base station device according to claim 11, wherein if the user equipment is in the odd-numbered network area group, in response to PMI=0, the channel in the first channel group allocated to the user equipment comprises a first channel:

$$[T_0 \ \cdots \ T_{2M-1}]V\frac{1}{2}\begin{bmatrix}1\\1\\1\\1\end{bmatrix} = [T_0 \ \cdots \ T_{2M-1}]\frac{1}{\sqrt{2}}\begin{bmatrix}1\\1\\0\\0\\1\\1\\0\\0\\\vdots\end{bmatrix},$$

wherein $T_{2M-1}$ represents a $(2M)^{th}$ network area, V represents a port mapping matrix of the user equipment, and the ellipsis represents 2M−8 repeated digits;

in response to PMI=2, the channel in the first channel group allocated to the user equipment comprises a second channel:

$$[T_0 \ \cdots \ T_{2M-1}]V\frac{1}{2}\begin{bmatrix}1\\-1\\1\\-1\end{bmatrix} = [T_0 \ \cdots \ T_{2M-1}]\frac{1}{\sqrt{2}}\begin{bmatrix}1\\-1\\0\\0\\1\\-1\\0\\0\\\vdots\end{bmatrix};$$

in response to PMI=9, the channel in the first channel group allocated to the user equipment comprises a third channel:

$$[T_0 \ \cdots \ T_{2M-1}]V\frac{1}{2}\begin{bmatrix}1\\j\\1\\j\end{bmatrix} = [T_0 \ \cdots \ T_{2M-1}]\frac{1}{\sqrt{2}}\begin{bmatrix}1\\j\\0\\0\\1\\j\\0\\0\\\vdots\end{bmatrix};$$

and in response to PMI=11, the channel in the first channel group allocated to the user equipment comprises a fourth channel:

$$[T_0 \ \cdots \ T_{2M-1}]V\frac{1}{2}\begin{bmatrix}1\\-j\\1\\-j\end{bmatrix} = [T_0 \ \cdots \ T_{2M-1}]\frac{1}{\sqrt{2}}\begin{bmatrix}1\\-j\\0\\0\\1\\-j\\0\\0\\\vdots\end{bmatrix}.$$

14. The base station device according to claim 11, wherein if the user equipment is in the even-numbered network area group, in response to PMI=1, the channel in the second channel group allocated to the user equipment comprises a fifth channel:

$$[T_0 \ \cdots \ T_{2M-1}]V\frac{1}{2}\begin{bmatrix}1\\j\\-1\\-j\end{bmatrix} = [T_0 \ \cdots \ T_{2M-1}]\frac{1}{\sqrt{2}}\begin{bmatrix}0\\0\\j\\-1\\0\\0\\j\\-1\\\vdots\end{bmatrix},$$

wherein $T_{2M-1}$ represents a $(2M)^{th}$ network area, V represents a port mapping matrix of the user equipment, and the ellipsis represents 2M−8 repeated digits;

in response to PMI=3, the channel in the second channel group allocated to the user equipment comprises a sixth channel:

$$[T_0 \ \cdots \ T_{2M-1}]V\frac{1}{2}\begin{bmatrix}1\\-j\\-1\\j\end{bmatrix} = [T_0 \ \cdots \ T_{2M-1}]\frac{1}{\sqrt{2}}\begin{bmatrix}0\\0\\j\\1\\0\\0\\j\\1\\\vdots\end{bmatrix};$$

in response to PMI=8, the channel in the second channel group allocated to the user equipment comprises a seventh channel:

$$[T_0 \quad \cdots \quad T_{2M-1}]V\frac{1}{2}\begin{bmatrix}1\\1\\-1\\-1\end{bmatrix}=[T_0 \quad \cdots \quad T_{2M-1}]\frac{1}{\sqrt{2}}\begin{bmatrix}0\\0\\1\\1\\0\\0\\1\\1\\\vdots\end{bmatrix};$$

and in response to PMI=10, the channel in the second channel group allocated to the user equipment comprises an eighth channel:

$$[T_0 \quad \cdots \quad T_{2M-1}]V\frac{1}{2}\begin{bmatrix}1\\-1\\-1\\1\end{bmatrix}=[T_0 \quad \cdots \quad T_{2M-1}]\frac{1}{\sqrt{2}}\begin{bmatrix}0\\0\\1\\-1\\0\\0\\1\\-1\\\vdots\end{bmatrix}.$$

15. The base station device according to claim 11, wherein if the user equipment is in the overlapped network area group, in response to PMI=4, the channel in the third channel group allocated to the user equipment comprises a ninth channel:

$$[T_0 \quad \cdots \quad T_{2M-1}]V\frac{1}{2}\begin{bmatrix}1\\\frac{1}{\sqrt{2}}(1+j)\\j\\-\frac{1}{\sqrt{2}}(1-j)\end{bmatrix}=[T_0 \quad \cdots \quad T_{2M-1}]\frac{1}{\sqrt{2}}\begin{bmatrix}\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\frac{1}{2}(1+j)\\\frac{1}{\sqrt{2}}j\\\vdots\end{bmatrix},$$

wherein $T_{2M-1}$ represents a $(2M)^{th}$ network area, V represents a port mapping matrix of the user equipment, and the ellipsis represents 2M−8 repeated digits;

in response to PMI=5, the channel in the third channel group allocated to the user equipment comprises a tenth channel:

$$[T_0 \quad \cdots \quad T_{2M-1}]V\frac{1}{2}\begin{bmatrix}1\\-\frac{1}{\sqrt{2}}(1-j)\\j\\\frac{1}{\sqrt{2}}(1+j)\end{bmatrix}=[T_0 \quad \cdots \quad T_{2M-1}]\frac{1}{\sqrt{2}}\begin{bmatrix}\frac{1}{2}(1-j)\\\frac{1}{\sqrt{2}}j\\\frac{1}{2}(1-j)\\-\frac{1}{\sqrt{2}}j\\\frac{1}{2}(1-j)\\\frac{1}{\sqrt{2}}j\\\frac{1}{2}(1-j)\\-\frac{1}{\sqrt{2}}j\\\vdots\end{bmatrix};$$

in response to PMI=6, the channel in the third channel group allocated to the user equipment comprises an eleventh channel:

$$[T_0 \quad \cdots \quad T_{2M-1}]V\frac{1}{2}\begin{bmatrix}1\\-\frac{1}{\sqrt{2}}(1+j)\\j\\\frac{1}{\sqrt{2}}(1-j)\end{bmatrix}=[T_0 \quad \cdots \quad T_{2M-1}]\frac{1}{\sqrt{2}}\begin{bmatrix}\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\frac{1}{2}(1+j)\\-\frac{1}{\sqrt{2}}j\\\vdots\end{bmatrix};$$

in response to PMI=7, the channel in the third channel group allocated to the user equipment comprises a twelfth channel:

$$[T_0 \cdots T_{2M-1}]V\frac{1}{2}\begin{bmatrix} 1 \\ \frac{1}{\sqrt{2}}(1-j) \\ -j \\ -\frac{1}{\sqrt{2}}(1+j) \end{bmatrix} = [T_0 \cdots T_{2M-1}]\frac{1}{\sqrt{2}}\begin{bmatrix} \frac{1}{2}(1-j) \\ -\frac{1}{\sqrt{2}}j \\ \frac{1}{2}(1jj) \\ \frac{1}{\sqrt{2}}j \\ \frac{1}{2}(1-j) \\ -\frac{1}{\sqrt{2}}j \\ \frac{1}{2}(1-j) \\ \frac{1}{\sqrt{2}}j \\ \vdots \end{bmatrix};$$

in response to PMI=12, the channel in the third channel group allocated to the user equipment comprises a thirteenth channel:

$$[T_0 \cdots T_{2M-1}]V\frac{1}{2}\begin{bmatrix} 1 \\ 1 \\ 1 \\ -1 \end{bmatrix} = [T_0 \cdots T_{2M-1}]\frac{1}{\sqrt{2}}\begin{bmatrix} 1 \\ 0 \\ 0 \\ j \\ 1 \\ 0 \\ 0 \\ j \\ \vdots \end{bmatrix};$$

in response to PMI=13, the channel in the third channel group allocated to the user equipment comprises a fourteenth channel:

$$[T_0 \cdots T_{2M-1}]V\frac{1}{2}\begin{bmatrix} 1 \\ 1 \\ -1 \\ 1 \end{bmatrix} = [T_0 \cdots T_{2M-1}]\frac{1}{\sqrt{2}}\begin{bmatrix} 0 \\ 1 \\ j \\ 0 \\ 0 \\ 1 \\ j \\ 0 \\ \vdots \end{bmatrix};$$

in response to PMI=14, the channel in the third channel group allocated to the user equipment comprises a fifteenth channel:

$$[T_0 \cdots T_{2M-1}]V\frac{1}{2}\begin{bmatrix} -1 \\ 1 \\ 1 \\ 1 \end{bmatrix} = [T_0 \cdots T_{2M-1}]\frac{1}{\sqrt{2}}\begin{bmatrix} 0 \\ 1 \\ -j \\ 0 \\ 0 \\ 1 \\ -j \\ 0 \\ \vdots \end{bmatrix};$$

and in response to PMI=15, the channel in the third channel group allocated to the user equipment comprises a sixteenth channel:

$$[T_0 \cdots T_{2M-1}]V\frac{1}{2}\begin{bmatrix} 1 \\ -1 \\ -1 \\ -1 \end{bmatrix} = [T_0 \cdots T_{2M-1}]\frac{1}{\sqrt{2}}\begin{bmatrix} 0 \\ -1 \\ j \\ 0 \\ 0 \\ -1 \\ j \\ 0 \\ \vdots \end{bmatrix}.$$

\* \* \* \* \*